United States Patent
Riedl et al.

(10) Patent No.: US 10,604,244 B2
(45) Date of Patent: Mar. 31, 2020

(54) COMBINATION ELASTOMERIC AND ELLIPSOIDAL PLAIN BEARING

(71) Applicant: Aktiebolaget SKF, Gothenburg (SE)

(72) Inventors: Daniel L Riedl, Marengo, IL (US); Lester John Temple James, Sturminster Newton (GB); Michael Brett Colton, Bristol (GB); William Andrew Curry, Weston-super-Mare (GB)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/815,143

(22) Filed: Nov. 16, 2017

(65) Prior Publication Data

US 2019/0144106 A1    May 16, 2019

(51) Int. Cl.
    *F16C 27/02*      (2006.01)
    *B64C 27/35*      (2006.01)
    (Continued)

(52) U.S. Cl.
    CPC .......... *B64C 27/35* (2013.01); *F16C 11/083* (2013.01); *F16C 27/066* (2013.01);
    (Continued)

(58) Field of Classification Search
    CPC . F16C 11/0614; F16C 11/0638; F16C 11/083; F16C 11/086; F16C 23/043;
    (Continued)

(56) References Cited

U.S. PATENT DOCUMENTS

| 4,243,274 A | * | 1/1981 | Greene | ................... F16C 17/10 384/111 |
| 4,268,094 A | * | 5/1981 | Greene | ................... F16C 17/03 384/107 |

(Continued)

FOREIGN PATENT DOCUMENTS

| DE | 10150189 A1 | 4/2003 |
| EP | 3056749 A1 | 8/2016 |

(Continued)

*Primary Examiner* — Phillip A Johnson
(74) *Attorney, Agent, or Firm* — J-Tek Law PLLC; Scott T. Wakeman; Mark A. Ussai

(57) ABSTRACT

A bearing assembly is for movably coupling first and second members, one being movable relative to the other. A plain bearing section includes an inner ring connectable with the first member and an outer convex bearing surface. An outer ring is disposed about the inner ring and has an inner concave bearing surface disposed against the inner ring bearing surface. The two bearing surfaces are formed such that one bearing surfaces slides against the other when the movable member displaces about a first axis and two bearing surfaces engage to prevent displacement between the two rings when the movable member displaces about a second axis. An elastomeric bearing section is disposed about the plain bearing section, is connected with the second member and formed such that at least a portion of the elastomeric bearing section flexes when the movable member angularly displaces about the second axis.

16 Claims, 13 Drawing Sheets

(51) Int. Cl.
*F16C 27/06* (2006.01)
*F16C 33/30* (2006.01)
*F16C 33/10* (2006.01)
*F16C 11/08* (2006.01)
*F16F 1/393* (2006.01)
*F16C 17/03* (2006.01)
*F16C 27/08* (2006.01)

(52) U.S. Cl.
CPC ........ *F16C 33/1075* (2013.01); *F16C 33/306* (2013.01); *F16F 1/393* (2013.01); *F16C 17/03* (2013.01); *F16C 27/063* (2013.01); *F16C 27/08* (2013.01); *F16C 2326/43* (2013.01)

(58) Field of Classification Search
CPC ...... F16C 23/045; F16C 27/02; F16C 27/063; F16C 35/02; F16C 35/10
See application file for complete search history.

(56) References Cited

U.S. PATENT DOCUMENTS

| | | | |
|---|---|---|---|
| 5,364,191 A * | 11/1994 | Gruber | B62D 7/16 |
| | | | 384/153 |
| 7,658,546 B2 * | 2/2010 | Clarke | F16C 11/0614 |
| | | | 384/192 |
| 9,334,048 B2 * | 5/2016 | Burnett | F16F 1/41 |
| 2013/0341458 A1 | 12/2013 | Sutton et al. | |
| 2015/0093057 A1 * | 4/2015 | Hunter | B64C 27/35 |
| | | | 384/125 |
| 2016/0238068 A1 * | 8/2016 | Bohm | B64C 13/30 |
| 2016/0238069 A1 * | 8/2016 | Bohm | B64C 13/30 |

FOREIGN PATENT DOCUMENTS

| | | | |
|---|---|---|---|
| GB | 2417054 A | 2/2006 | |
| WO | WO-2005075850 A1 * | 8/2005 | ............. B64C 27/56 |

* cited by examiner

COMBINATION ELASTOMERIC AND ELLIPSOIDAL PLAIN BEARING

BACKGROUND OF THE INVENTION

The present invention relates to bearing assemblies, and particularly to elastomeric bearing assemblies used in aircraft applications.

Elastomeric bearings are known and are often formed of a plurality of alternating annular or cylindrical layers of elastomer and metal and generally include a central bore for receiving a shaft or pin. Such bearings are capable of supporting pivoting or limited partial rotation or twisting motions of the pin or shaft, or a link or other member coupled by the pin/shaft to a housing, bracket, etc. However, when such pivoting or twisting of the shaft, link, etc. is greater than a certain angular magnitude, the elastomeric layers can become damaged, particularly after prolonged use.

SUMMARY OF THE INVENTION

In one aspect, the present invention is a bearing assembly for movably coupling a first, inner member with a second, outer member, a movable one of the first and second members being angularly displaceable with respect to the other one of the two members about a first axis extending centrally through the inner member and about at least one second axis generally intersecting the first axis or skewed with respect to the first axis. The bearing assembly comprises an inner plain bearing section including an inner ring, the inner ring being connectable with the first member and having an outer convex bearing surface, and an outer ring disposed about the inner ring and having an inner concave bearing surface disposed against the inner ring bearing surface. The inner ring bearing surface and outer ring bearing surface are each configured such that one of the inner and outer ring bearing surfaces slides against the other one of the inner and outer ring bearing surfaces when the movable one of the first and second members angularly displaces about the first axis. The two bearing surfaces are further configured such that each one of the inner and outer ring bearing surfaces engages against the other one of the inner and outer ring bearing surfaces so as to prevent relative displacement between the inner and outer rings when the movable member one of the first and second members angularly displaces about the at least one second axis. Further, an outer elastomeric bearing section is disposed about the plain bearing section, connected with the second member and configured such that at least a portion of the elastomeric bearing section flexes when the movable one of the first and second members angularly displaces about the second axis.

In another aspect, the present invention is again a bearing assembly for movably coupling a first, inner member with a second, outer member, a movable one of the first and second members being angularly displaceable with respect to the other one of the two members about a first axis extending centrally through the inner member and about at least one second axis generally intersecting the first axis or skewed with respect to the first axis. The bearing assembly comprises an inner plain bearing section including an inner ring, the inner ring being connectable with the first member so as to connect the first member with the bearing and having an outer, partially ellipsoidal convex bearing surface. An outer ring is disposed about the inner ring and has an inner concave, partially ellipsoidal bearing surface disposed against the inner ring bearing surface. The inner ring bearing surface and outer ring bearing surface are each configured such that one of the inner and outer ring bearing surfaces slides against the other one of the inner and outer ring bearing surfaces when the movable one of the first and second members angularly displaces about the first axis. The two bearing surfaces are further configured such that each one of the inner and outer ring bearing surfaces engages against the other one of the inner and outer ring bearing surfaces so as to prevent relative displacement between the inner and outer rings when the movable member one of the first and second members angularly displaces about the at least one second axis. Further, an outer, laminated elastomeric bearing section is disposed about the plain bearing section, connected with the second member and configured such that at least a portion of the elastomeric bearing section flexes when the movable one of the first and second members angularly displaces about the second axis.

In a further aspect, the present invention is a mechanical assembly comprising the first, inner member, the second, outer member and the bearing assembly as described in either one of the previous paragraphs.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
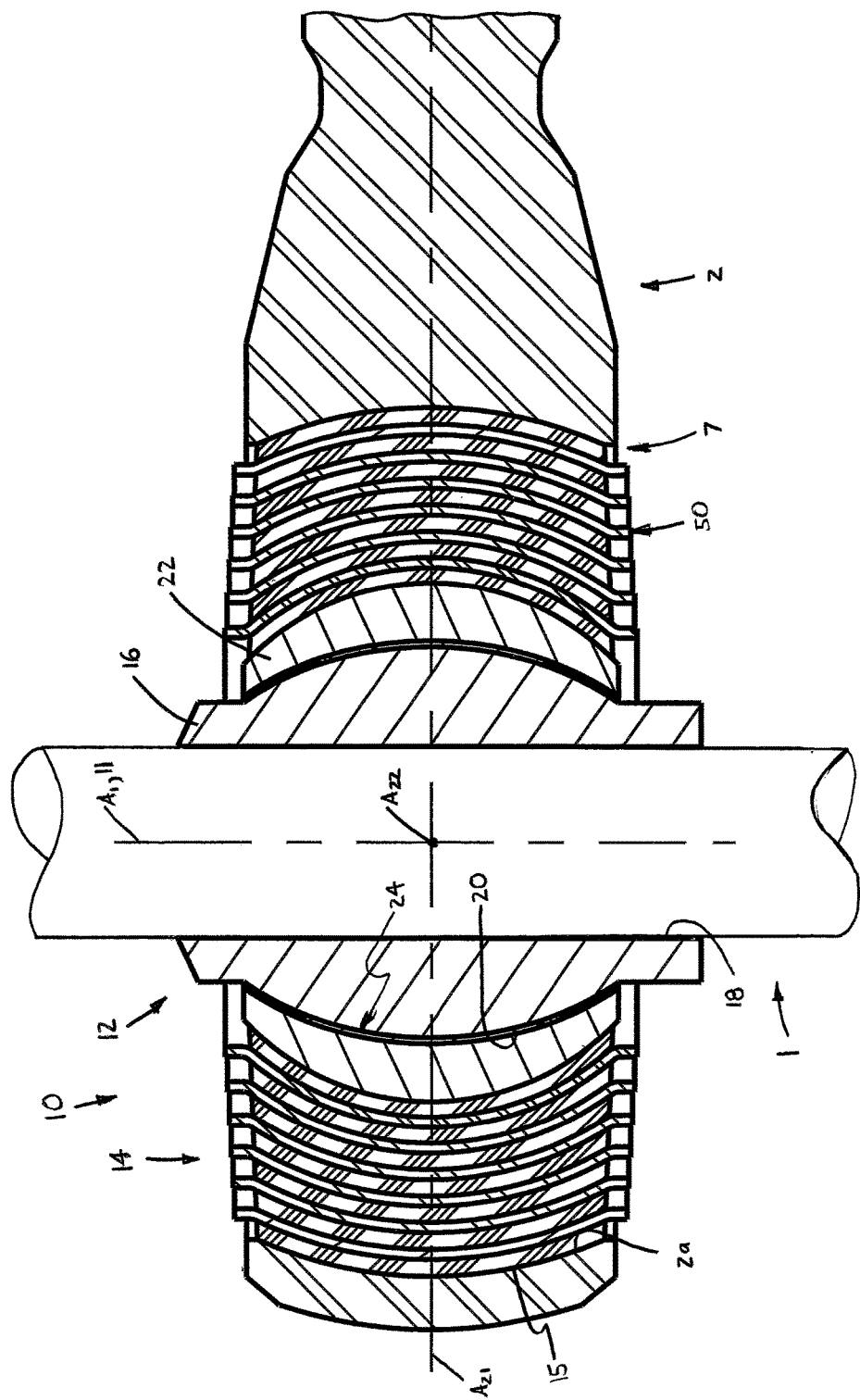
FIG. 1 is an axial cross-sectional view of the bearing assembly of the present invention, shown in a mechanical assembly coupled with an inner, first member and an outer, second member.
Figure 2:
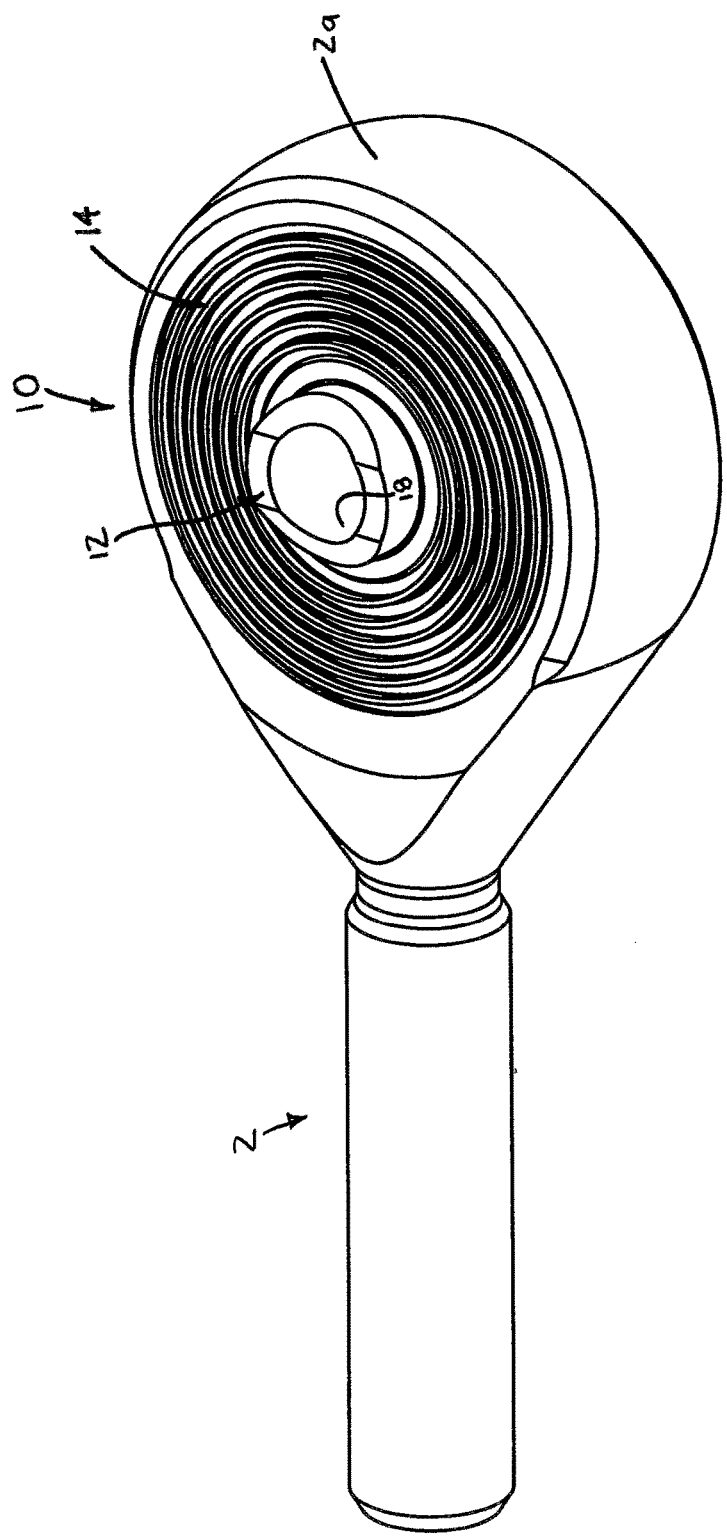
FIG. 2 is a perspective view of the bearing assembly connected with the second member.
Figure 3:
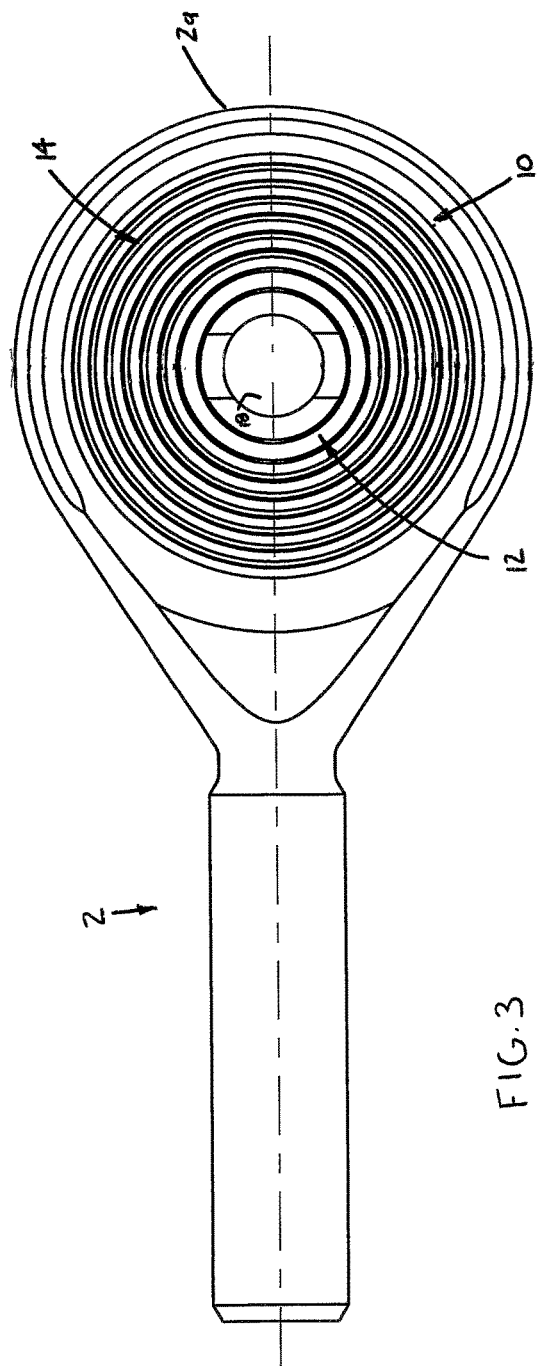
FIG. 3 is a top plan view of the bearing assembly and second member.
Figure 4:
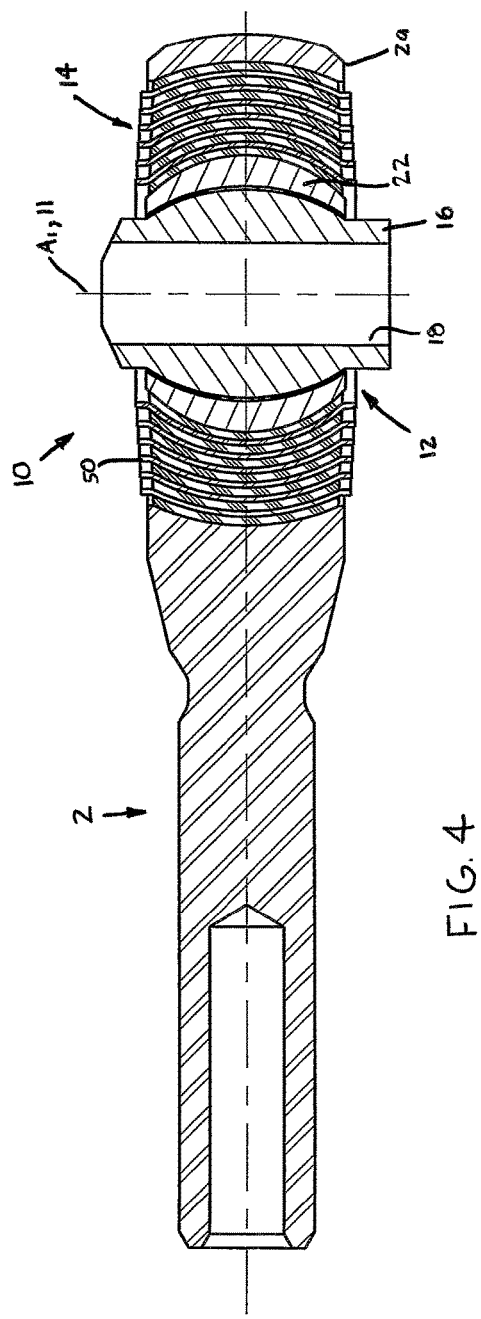
FIG. 4 is a view through line 4-4 of FIG. 3.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-16 a bearing assembly 10 for movably coupling an inner, first member 1 with an outer, second member 2 so as to form a mechanical assembly 3. One of the first and second members 1, 2 is angularly displaceable about a first axis $A_1$ extending centrally through the first member 1 and also about at least one second axis $A_{2n}$ generally intersecting (e.g., perpendicular as depicted), or generally skewed with respect to, the first axis $A_1$. Preferably, the second member 2 "turns" or "twists" about the first axis $A_1$ and/or "tilts" or "cocks" relative to the first member 1 about one or more second axes $A_{2n}$, or vice-versa. Also, the mechanical assembly 3 is preferably for a rotary aircraft wing assembly; for example, the second member 2 may be a connecting/adjustment rod 4 (or a portion thereof) and the first member 1 may be a pin 5 for connecting the rod 4 to a frame 6, as depicted in FIG. 14, but may be any other appropriate components having relative motion about two or more axes $A_1$, $A_{2n}$.

The bearing assembly 10 basically comprises an inner plain bearing section 12 connected or connectable with the first member 1 and an outer, generally cylindrical elastomeric bearing section 14 disposed about the plain bearing section 12 and connected with the second member 2. The two bearing sections 12, 14 are generally centered about a bearing centerline 11, which is substantially coaxial with the first axis $A_1$ when connected with the first member 1. The inner plain bearing section 12 includes an inner ring 16 connectable with the first member 1 and having an outer convex bearing surface 20. Preferably, the inner ring 16 has a central bore 18 configured to receive a portion of the first member 1, so as to connect the first member 1 with the bearing assembly 10, but may alternatively include a shaft portion 19 (FIG. 16) or any other appropriate means to connect the ring 16 with the first member 1. Further, an outer ring 22 is disposed about the inner ring 16 and has an inner concave bearing surface 24 disposed against the inner ring bearing surface 20. The inner ring bearing surface 20 and the outer ring bearing surface 24 are each configured such that one of the inner and outer ring bearing surfaces 20 or 24 slides against the other one of the ring bearing surfaces 24, 20, respectively, when the movable one of the first and second members 1 or 2 angularly displaces about the first axis $A_1$.

Also, the bearing surfaces 20, 24 are further configured such that each one of the inner and outer ring bearing surfaces 20, 24 engages against the other one of the inner and outer ring bearing surfaces 24, 20 to prevent relative displacement between the inner and outer rings 16, 22 when the movable one of the first and second members 1, 2 angularly displaces about the at least one second axis $A_{2n}$. Further, the elastomeric bearing section 14 is configured such that at least a portion of the elastomeric bearing 14 flexes when the movable one of the first and second members 1, 2 angularly displaces about the at least one second axis $A_{2n}$, thereby supporting relative movement between the inner and outer members 1, 2. Preferably, the second member 2 has an inner circumferential surface 2a defining a bore 7 and the bearing assembly 10 is disposed within the bore 7, the elastomeric bearing section 14 having an outer surface 15 bonded or frictionally engaged with the second member inner surface 2a to connect the bearing section 14 with the second member 2.

Preferably, the movable one of the first and second members 1 or 2 is angularly displaceable about a plurality of separate second axes $A_{2n}$ (e.g., $A_{21}$, $A_{22}$, etc.), each generally intersecting the first axis $A_1$ (i.e., either perpendicular (as shown) or forming an acute angle) or generally skewed with respect to the first axis $A_1$. As such, the inner and outer rings 16, 22 of the plain bearing section 12 are configured to angularly displace about each separate one of the second axes $A_{2n}$ when the inner member 1 displaces relative to the outer member 2, and at least a portion of the elastomeric bearing section 14 is configured to flex whenever either one of the first and second members 1, 2 angularly displaces about each one of the second axes $A_{2n}$. Therefore, the bearing assembly 10 is capable of supporting the relative movement between the two members/components 1, 2 during a variety of motions as typically occurs during operation of a rotary aircraft or other complex mechanism or machine.

Figure 8:
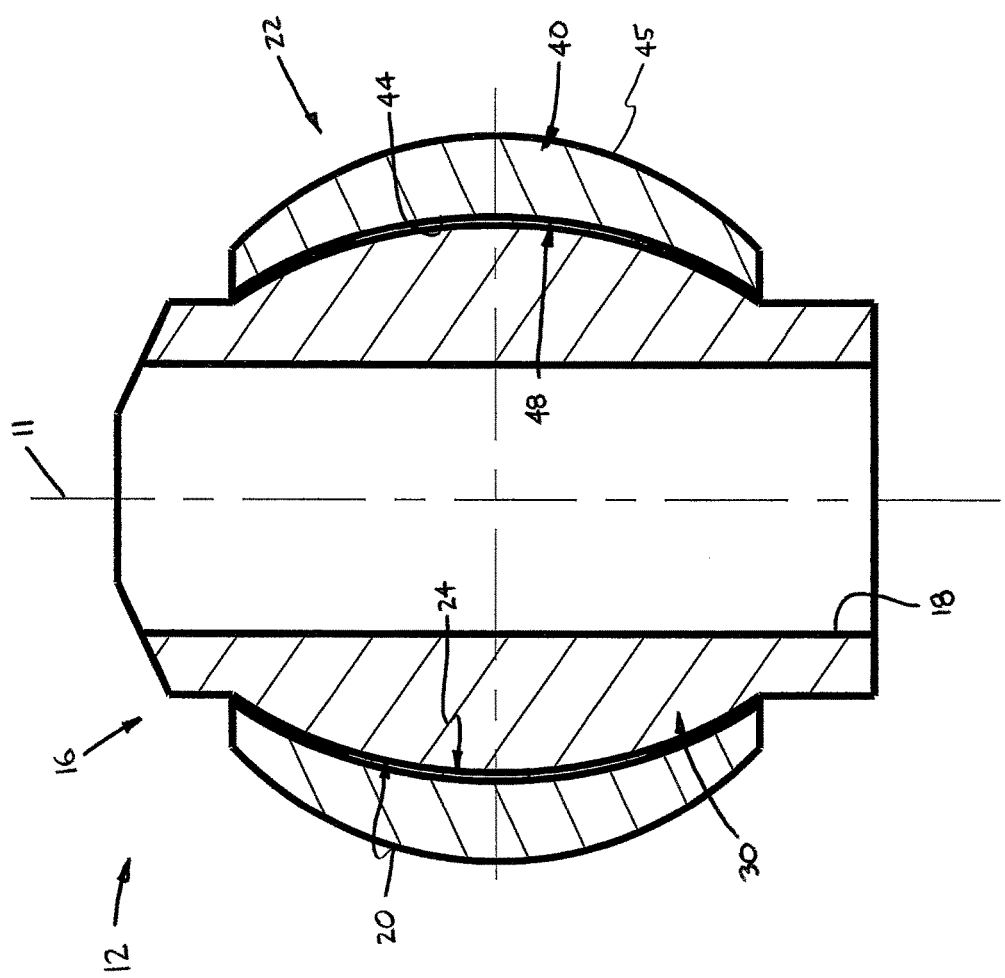
FIG. 8 is an enlarged, axial cross-sectional view of the plain bearing section.
Figure 9:
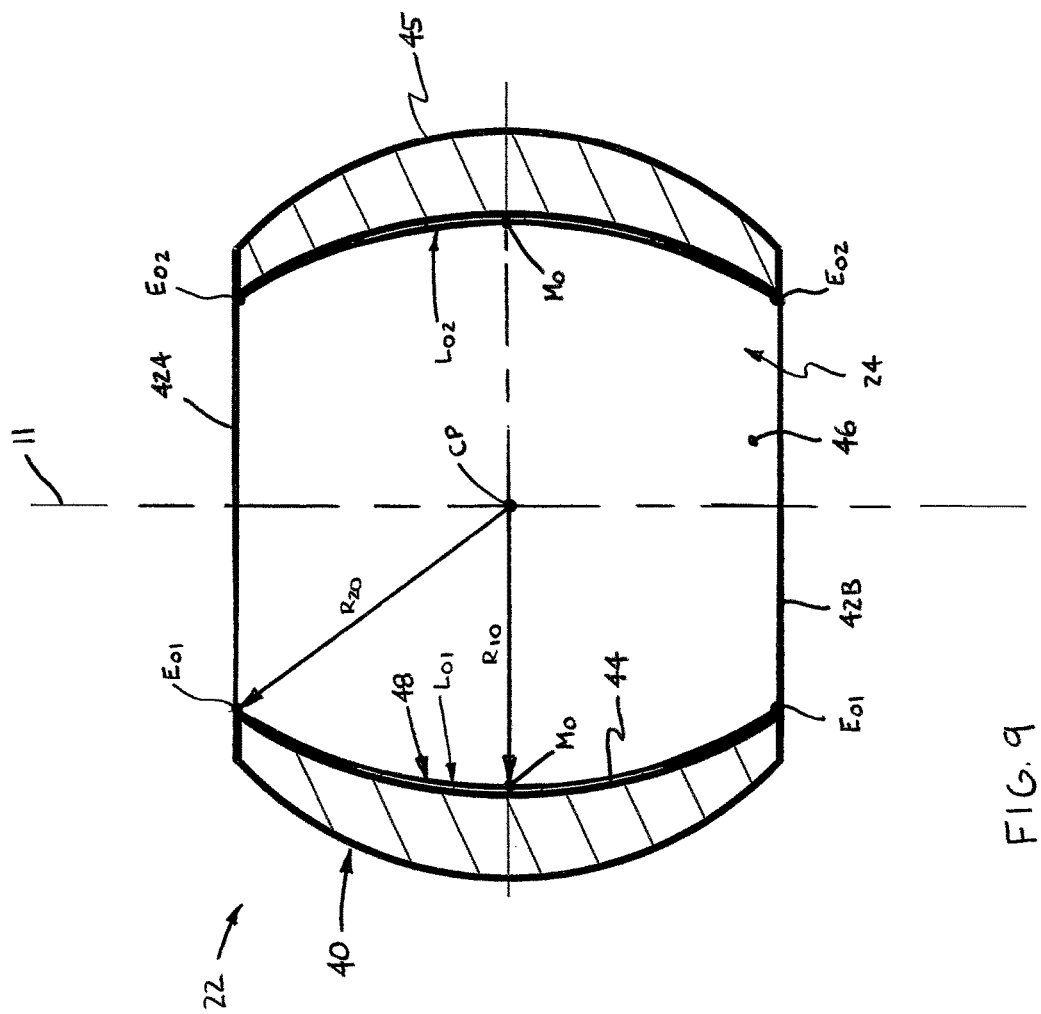
FIG. 9 is an axial cross-sectional view of an outer ring of the plain bearing section.

Referring to FIGS. 1 and 4-12, preferably, both the convex outer bearing surface 20 of the inner ring 16 and the concave inner bearing surface 24 of the outer ring 22 is partially ellipsoidal and centered about the centerline 11 and first axis $A_1$, each of which extends centrally through the inner ring 16, so that the surfaces 20, 24 are symmetrical about the first axis $A_1$. Specifically, each one of the inner and outer rings 16, 22 is shaped such that planar cross-sections through the first axis $A_1$ are bounded by two curved line sections $L_{I1}$, $L_{I2}$ and $L_{O1}$, $L_{O2}$ each having opposing end points $E_{I1}$, $E_{I2}$ and $E_{O1}$, $E_{O2}$, respectively, and a middle point $M_I$, $M_O$, respectively, as indicated in FIG. 8. Each middle point $M_I$, $M_O$ is located a first radial distance $R_{1I}$, $R_{1O}$, respectively, from a center point CP on the first axis $A_1$ and each end point $E_{I1}$, $E_{I2}$ and $E_{O1}$, $E_{O2}$ is located a second, greater radial distance $R_{2I}$, $R_{2O}$, respectively, from the center point CP, as indicated in FIG.

With such generally elliptical profiles, either bearing surface 20, 24 is capable of slidably displacing against the other surface 24, 20 when one of the inner and outer rings 16, 22 turns or rotates about the first axis $A_1$. However, a torque applied to one of the plain bearing rings 16, 22 generally about a second axis $A_{2n}$ by movement of one of the members 1, 2 causes each elliptical bearing surface 20, 24 to wedge against the other bearing surface 24, 20 due to the surfaces 20, 24 being non-symmetrical about any of the second axis $A_{2n}$. Thereby, relative movement of one of the rings 16, 22 with respect to the other ring 22, 16 about the second axis $A_{2n}$ is prevented.

Figure 14:
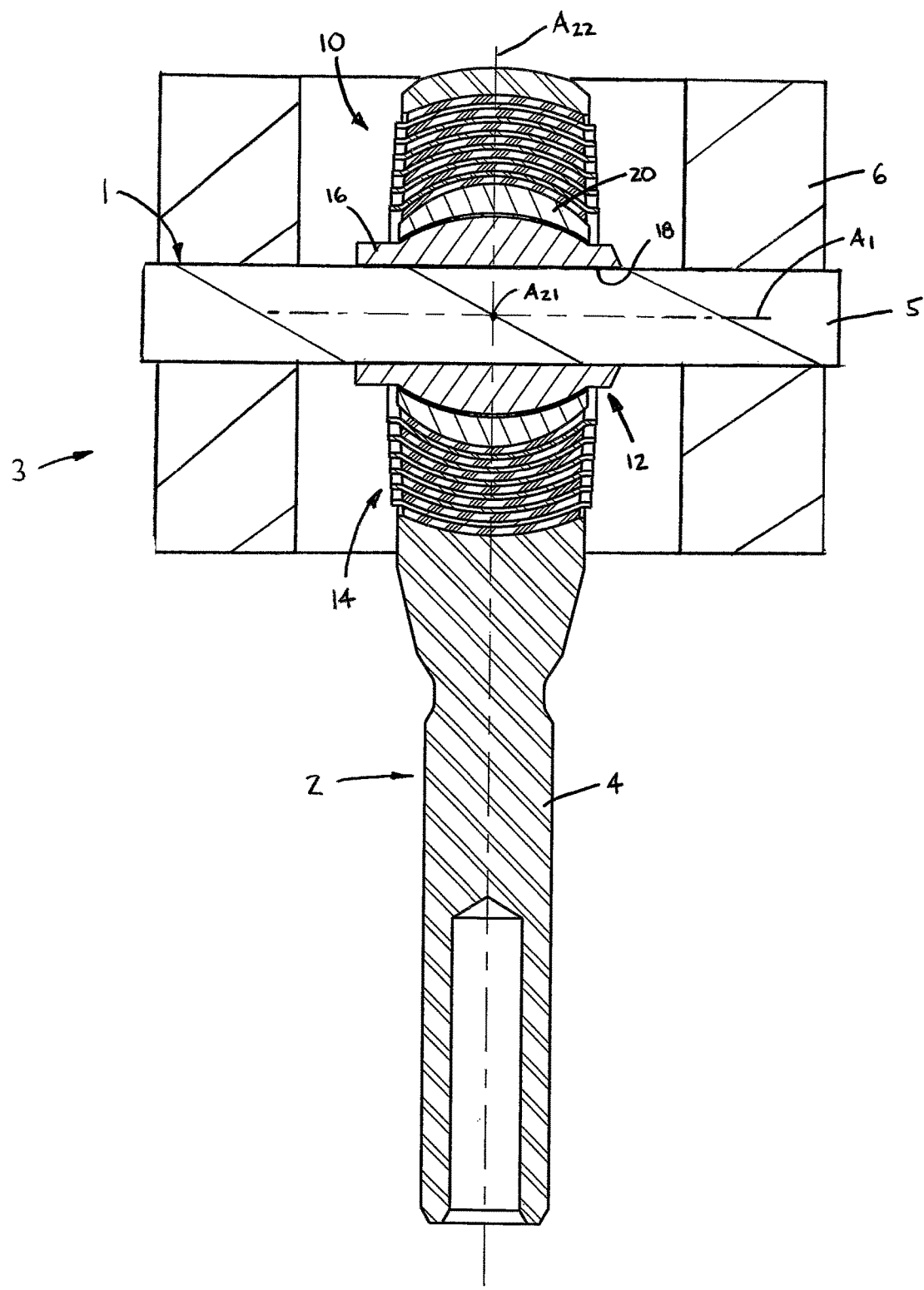
FIG. 14 is an axial cross-sectional view of the bearing assembly in one preferred application of the present invention in which the first, inner member is relatively fixed and the second, outer member is relatively displaceable.
Figure 15:
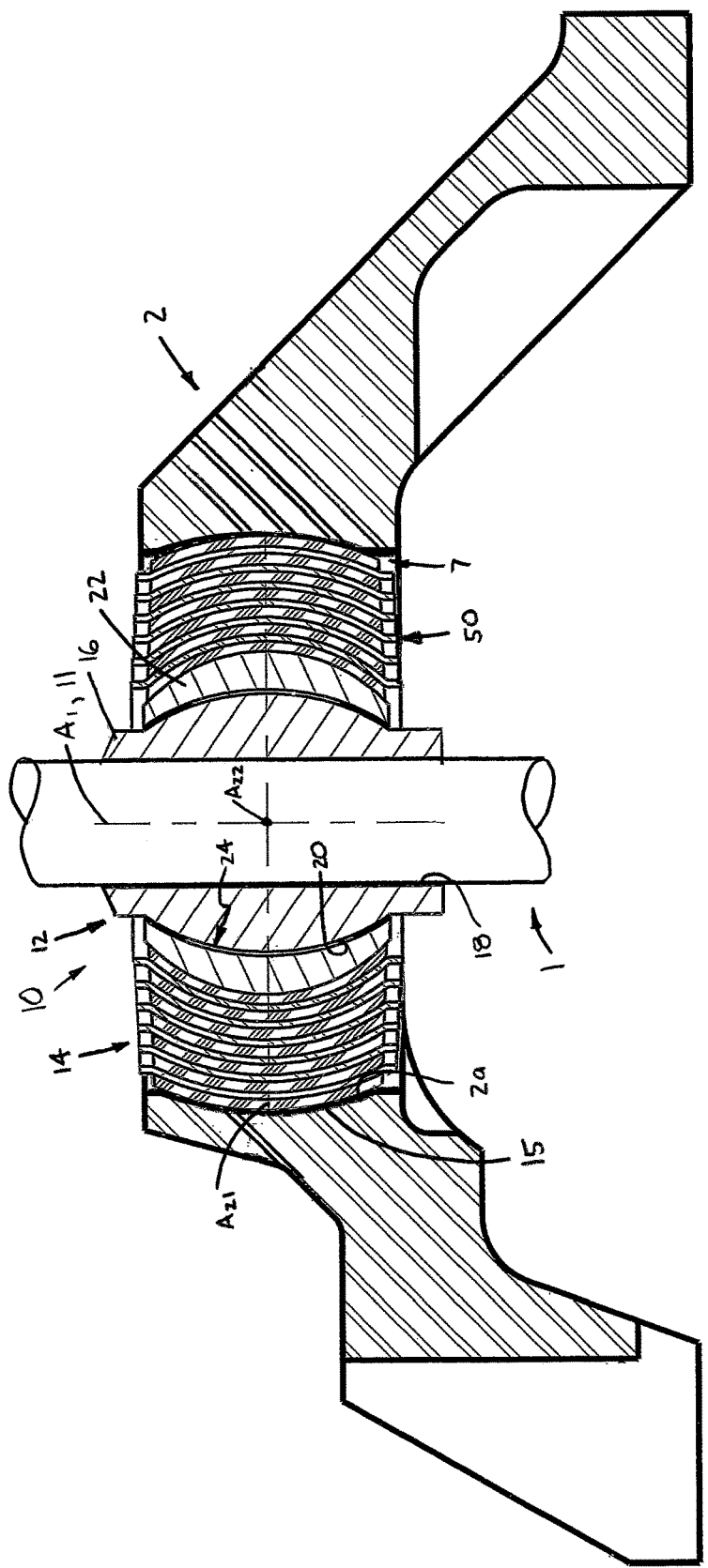
FIG. 15 is an axial cross-sectional view of the bearing assembly in another preferred application of the present invention in which the first, inner member is relatively displaceable and the second, outer member is relatively fixed.

As such, in applications wherein the first member 1 is fixed and the second, outer member 2 is movable, e.g., as depicted in FIG. 14, the outer ring bearing surface 24 slidably displaces against the inner ring bearing surface 20 when the outer ring 22, the elastomeric bearing portion 14 and the second member 2 angularly displace about the first axis $A_1$ or/and the elastomeric bearing portion 14 flexes to enable the second member 2 to angularly displace about one or more second axes $A_{2n}$ while the outer and inner rings 16, 22 remain fixed with respect to the second axis(es) $A_{2n}$. Alternatively, if the inner member 1 is movable and the outer member 2 relatively stationary or fixed, as shown in FIG. 15, the inner ring bearing surface 20 slidably displaces against the outer ring bearing surface 24 when the inner ring 16 and first member 1 angularly displace about the first axis $A_1$ or/and the inner and outer rings 16, 20 and the first member 1 angularly displaces about one or more second axes $A_{2n}$ while the elastomeric bearing portion 14 flexes relative to the fixed outer member 2.

Figure 11:
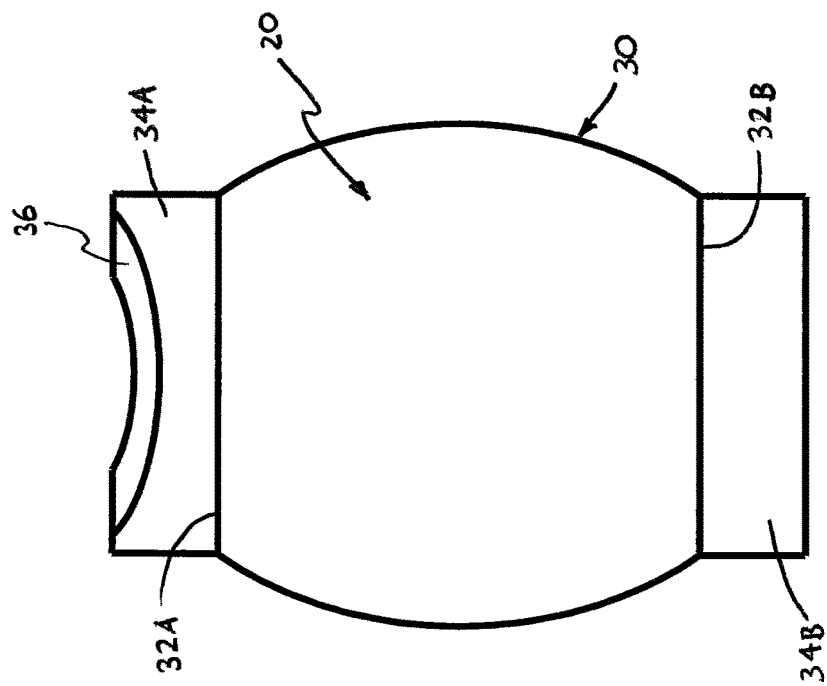
FIG. 11 is a side elevational view of the plain bearing inner ring.
Figure 10:
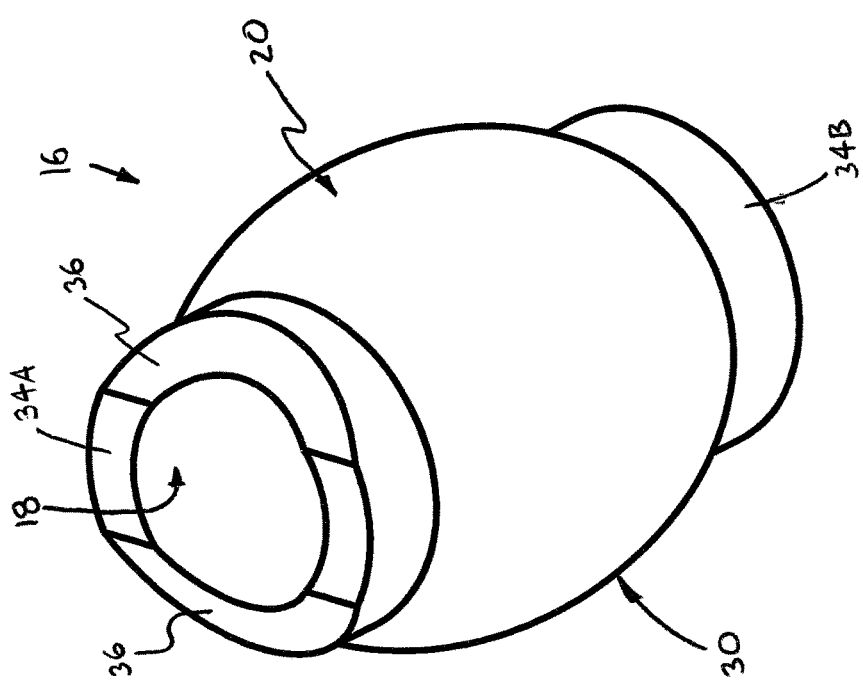
FIG. 10 is perspective view of an inner ring of the plain bearing section.
Figure 12:
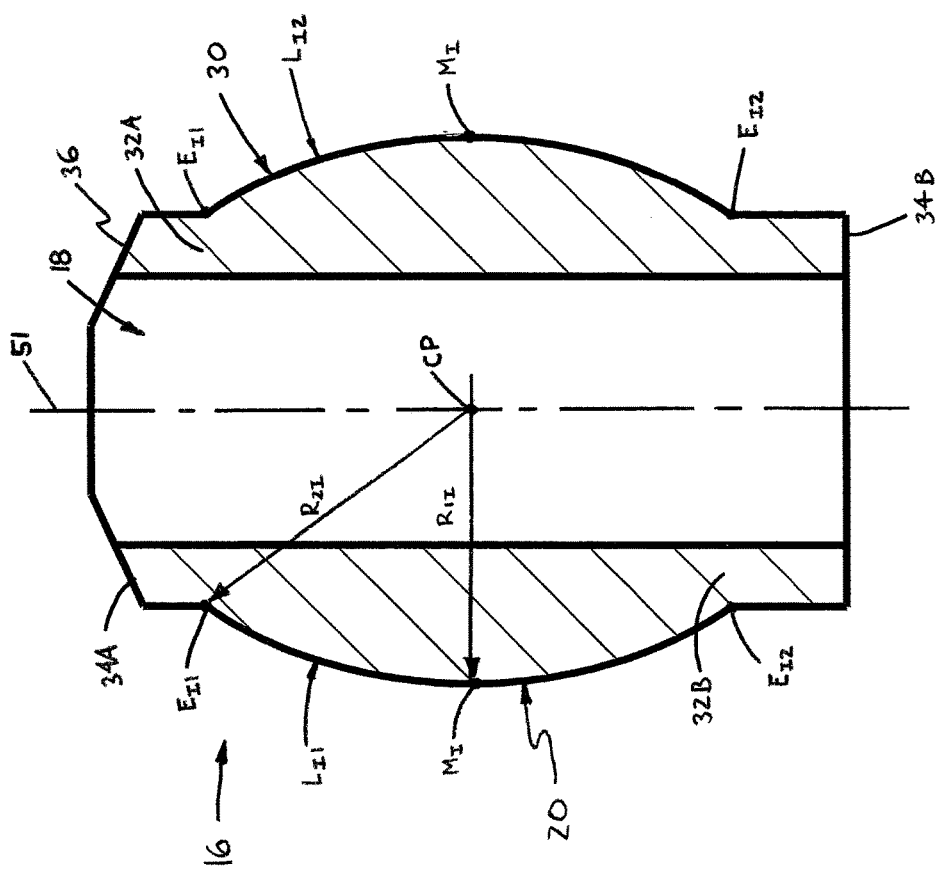
FIG. 12 is an enlarged, axial cross-sectional view of the plain bearing inner ring.
Figure 16:
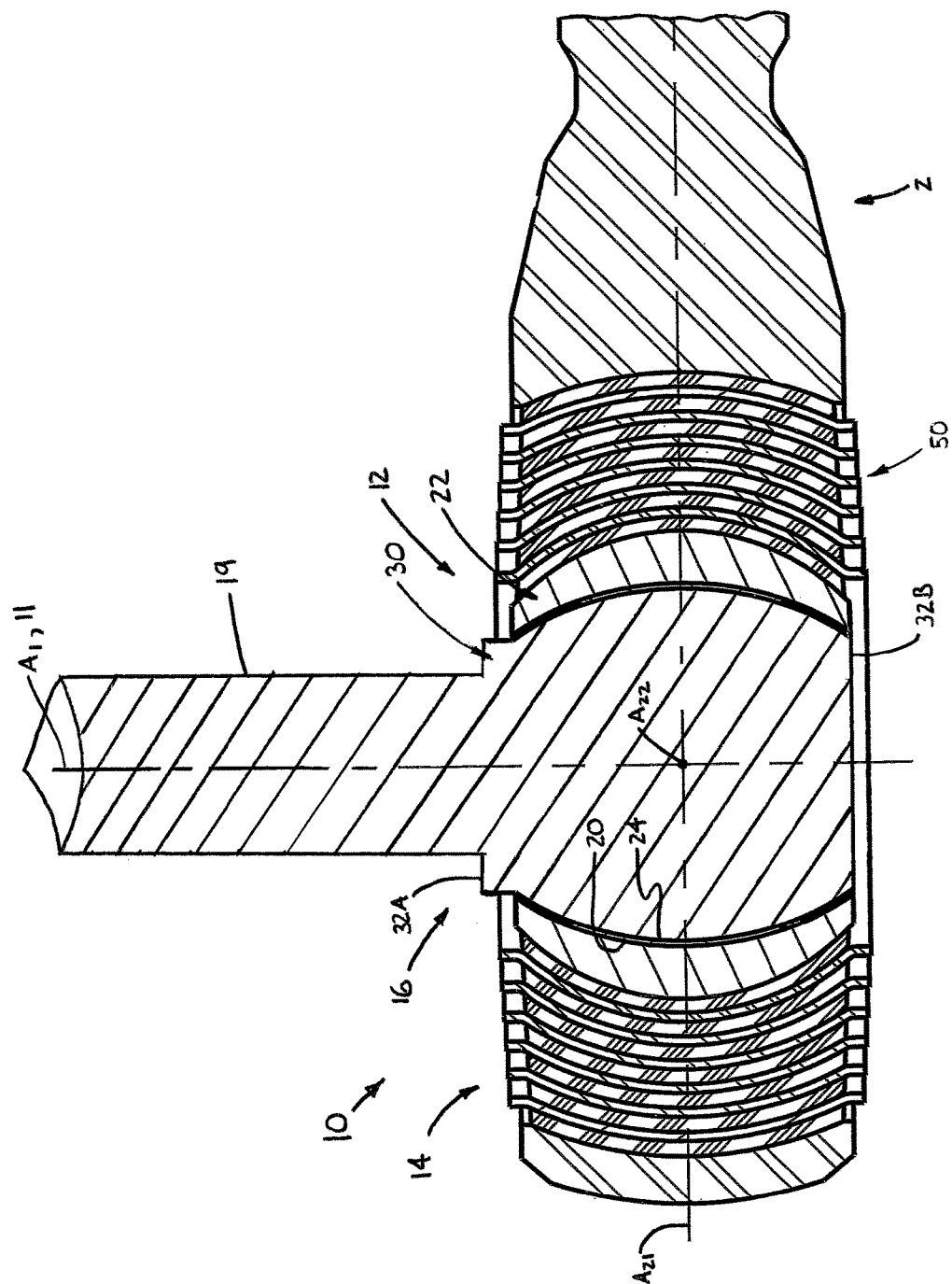
FIG. 16 is an axial cross-sectional view of an alternative construction of the bearing assembly of the present invention in which the plain bearing inner ring has a shaft portion connectable with the first, inner member.

Referring to FIGS. 10-12, the plain bearing inner ring 16 preferably includes a partially ellipsoidal body 30 sized to be disposed within a bore 44 of the outer ring 22, as described below. The ellipsoidal body 30 provides the convex bearing surface 20 and has two opposing axial ends 32A, 32B, the preferred central bore 18 of the inner ring 16 extending between the two ends 32A, 32B. Preferably, the ellipsoidal body 30 of the inner ring 16 has two generally cylindrical end portions 34A, 34B each extending outwardly from a separate one of the two body axial ends 32A, 32B, respectively. One or both of the cylindrical end portions 34A, 34B may be provided with angled surface sections 36 engageable by a portion of the first, inner member 1 to prevent relative rotation between the inner ring 16 and the first, inner member 1. Alternatively, as shown in FIG. 16, the ellipsoidal body 30 may be formed substantially solid, i.e., without a central bore, and may include the shaft portion 19 extending axially outwardly from one body end 32A or 32B. The shaft portion 19 is configured to attach to or otherwise engage with the first member 1 so as to connect the member 1 with the bearing assembly 10.

Referring now to FIGS. 6-9, the plain bearing outer ring 22 preferably includes a partially spherical body 40 having opposing axial end faces 42A, 42B and a concave, preferably elliptical inner surface 44 extending generally axially between the end faces 42A, 42B and defining an interior bore 46. Alternatively, the body 40 may have any other appropriate shape, such as for example, generally cylindrical, as long as the inner surface 24 is formed generally as described above. Further, the outer ring 22 preferably further includes a liner layer 48 disposed on the body inner surface 44 and providing the bearing surface 24 of the outer ring 22. The liner layer 48 is formed of a material having a hardness substantially lesser than a hardness of the inner ring material, and may be a polymeric material, such as polytetrafluoroethylene (PTFE), Nylon, PEEK, etc., graphite or a relatively soft metallic material (e.g., bronze, etc.).

Preferably, both the inner ring body 30 and the outer ring body 40 are each formed of a metallic material such as aluminum, low carbon steel, etc., such that the relatively "soft" liner layer 48 is disposed against the metallic inner ring 16. Alternatively, a liner layer (not shown) may be provided on the outer surface of the inner ring 16 or one of the inner and outer rings 16, 22 may be formed of a relatively soft metallic material (e.g., bronze) without any liner layer being provided.

Figure 5:
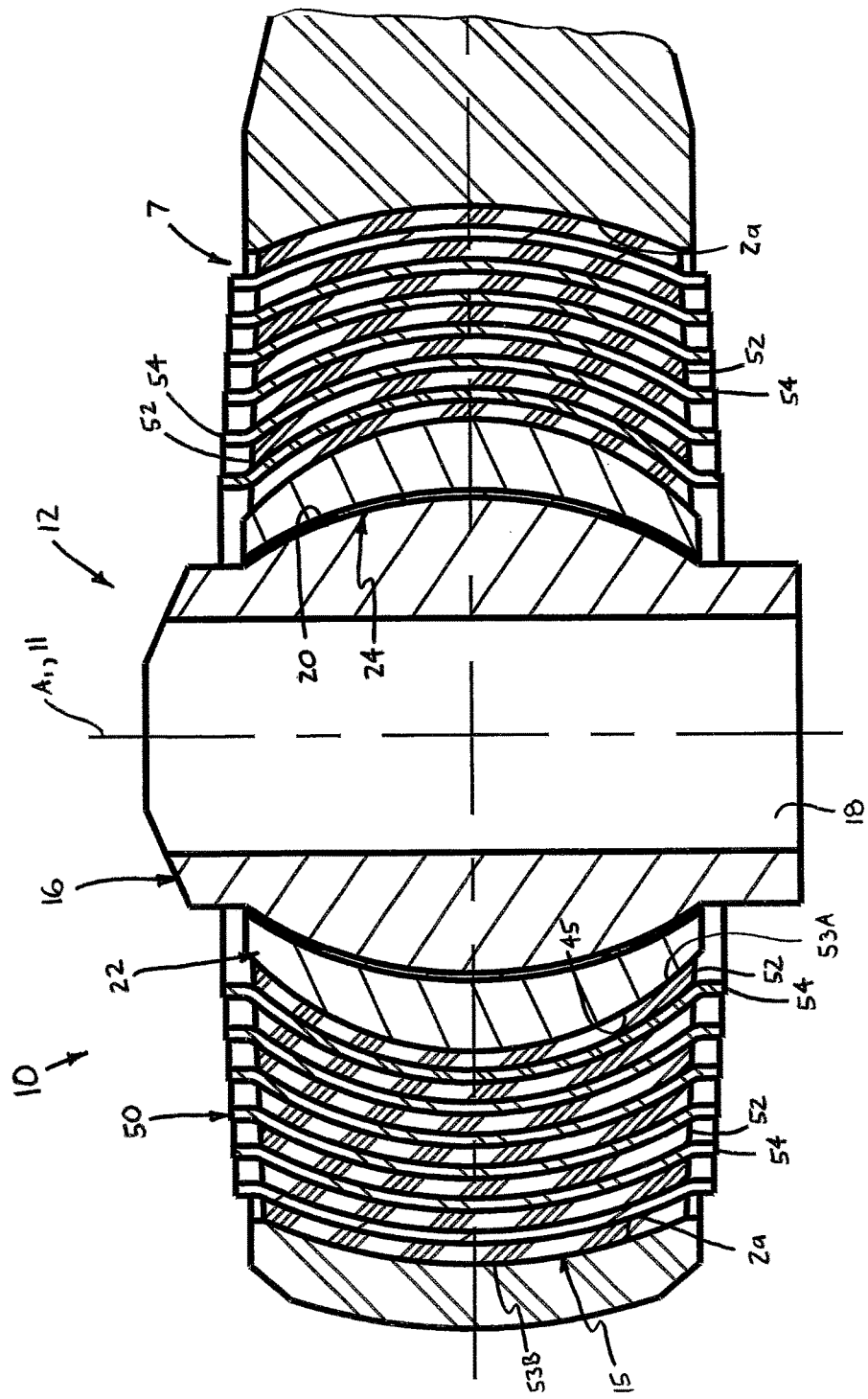
FIG. 5 is an enlarged, broken-away view of a portion of FIG. 1, shown without the first member.
Figure 7:
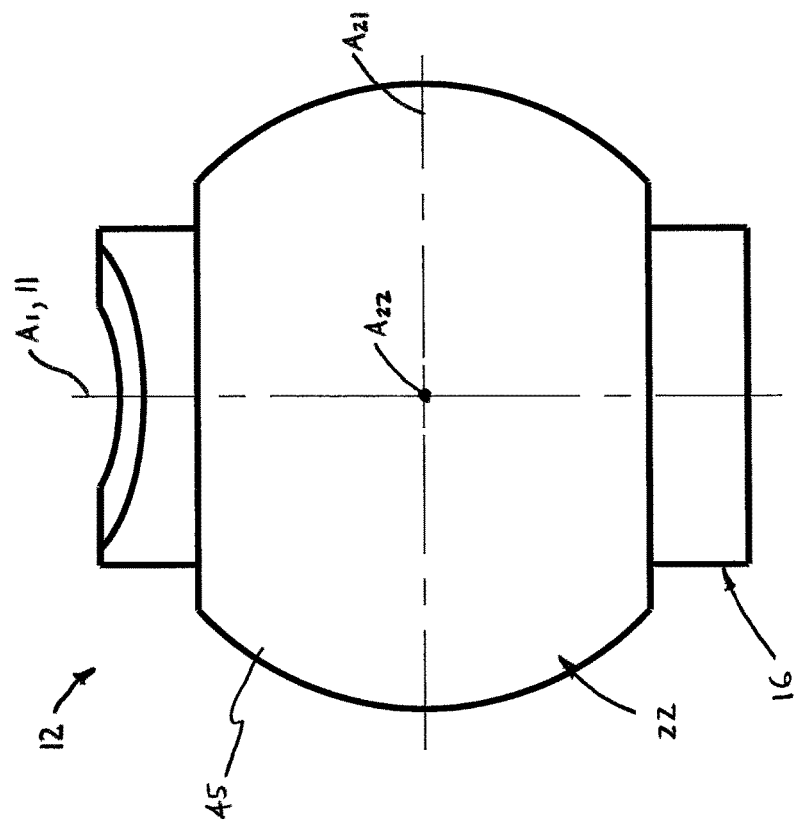
FIG. 7 is a side elevational view of the plain bearing section.
Figure 6:
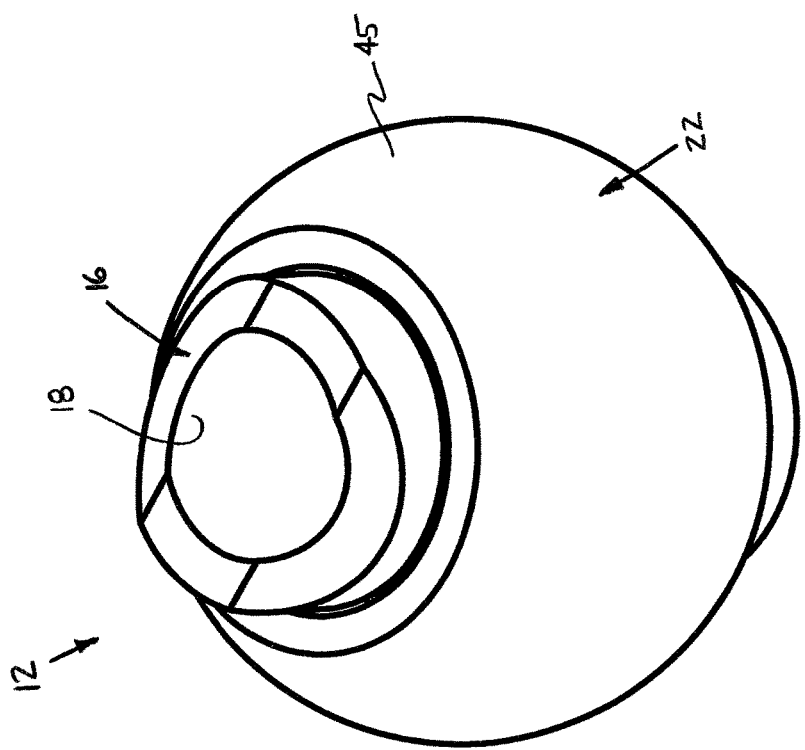
FIG. 6 is a perspective view of a plain bearing section of the bearing assembly.
Figure 13:
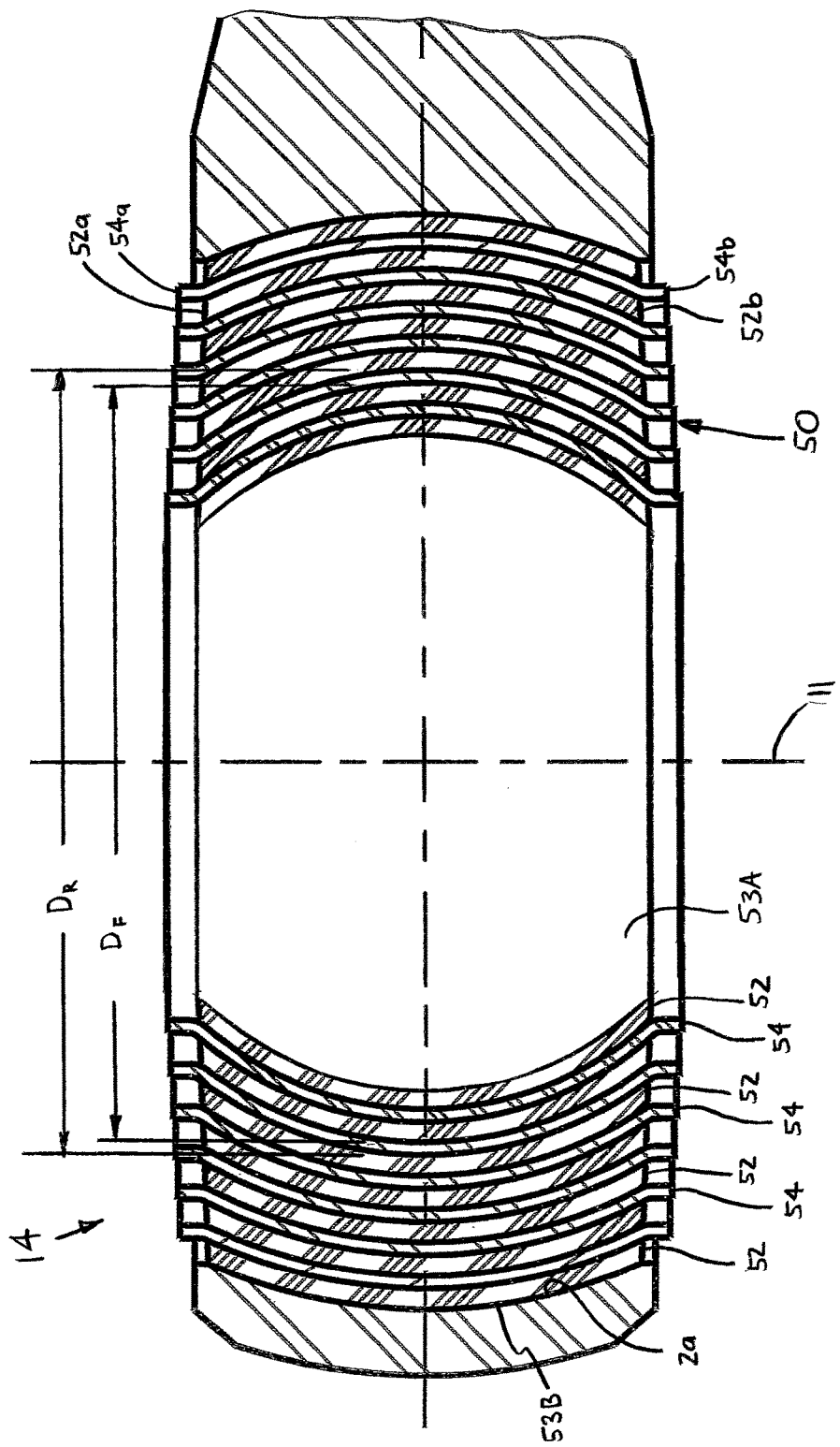
FIG. 13 is an axial cross-sectional view of an elastomeric bearing section of the bearing assembly, shown connected with the outer, second member.

Referring now to FIGS. 1, 5 and 13, the elastomeric bearing section 14 is preferably formed as a laminated bearing 50 including a plurality of alternating, substantially flexible laminae 52 and substantially rigid laminae 54 nested coaxially generally about the bearing centerline 11. The laminated bearing section 14 is configured such that at least a portion of the laminated bearing section 14 flexes or deflects (e.g., pivots and/or twists) when the first member 1 and/or the second member 2 angularly displaces about at least one second axis $A_{2n}$. Specifically, at least one and preferably a plurality of the flexible laminae 52 are each compressed, extended and/or twisted relative to a pair of coaxially or radially adjacent rigid laminae 54 (i.e., on each radial side of the specific lamina 52) during flexure of the laminated bearing section 14, to thereby enable or accommodate angular displacements of the second member 2 relative to the first member 1, or vice-versa, when tilting or pivoting about a second axis $A_{2n}$ perpendicular to the first, central axis $A_1$.

Alternatively, the elastomeric bearing section 14 may be formed of a single generally cylindrical solid elastomeric body (not shown) or a plurality of generally wedge-shaped elastomeric body sections (none shown), each having an inner surface attached to the plain bearing outer ring 22 and an outer surface attached to the second member 2. With the solid cylindrical body or wedge shaped body sections, the elastomeric bearing section 14 bends, deflects or twists as necessary to accommodate movement of one of the first and second members 1, 2 about one or more second axes $A_{2n}$.

Referring to FIGS. 5 and 13, the preferred laminated bearing section 14 is preferably formed by disposing or interposing alternating layers of generally tubular flexible laminae 52 and generally tubular rigid laminae 54 such that each flexible layer/lamina 52 is surrounded circumferentially by a diametrically larger rigid lamina 54, and vice-versa. In other words, each one of the flexible and rigid laminae 52, 54 has an outside diameter $d_F$, $d_R$ and the plurality of laminae 52, 54 are arranged such that each one of the laminae 52, 54 is disposed within all of the other laminae 52, 54 having an outside diameter $d_F$, $d_R$ greater than the outside diameter $d_F$ or $d_R$ of the one lamina 52 or 54, as indicated in FIG. 13. Preferably, the laminated bearing section 14 is formed such the height or axial length of the laminae 52, 54 decreases in a direction radially outwardly from the bearing centerline 11.

Specifically, each one of the laminae 52, 54 has opposing axial ends 52a, 52b and 54a, 54b, respectively, and an axial length (not indicated) between the opposing axial ends 52a, 52b and 54a, 54b, with the laminae 52, 54 arranged so that the axial length of each laminae 52 or 54 is lesser than the axial length of all laminae 52, 54 disposed within the one laminae 52, 54 (i.e., the laminae axial length decreases radially outwardly). However, the laminated bearing section 14 may be formed with laminae 52, 54 having an axial length that increases outwardly from the centerline 11 or having the substantially the same axial length. Furthermore, each one of the flexible and rigid laminae 52, 54 is preferably partially spherical, as depicted in the drawing figures, but may alternatively be substantially circular cylindrical or any other appropriate shape.

Preferably, each one of the flexible laminae 52 is formed of an elastomer, such as for example, natural or synthetic rubber, and each one of the rigid laminae 54 is formed of a metallic material, such as steel or aluminum, but may be formed of any other appropriate rigid material, such as a ceramic material, a rigid polymer or plastic, etc. Each one of the rigid laminae 54 may include a single, generally tubular shell or may be formed of a plurality of arcuate shell sections spaced circumferentially about the body centerline 51. Further, each flexible lamina 52 is preferably bonded to both a radially-inner adjacent rigid lamina 54 and to a radially-outer adjacent rigid lamina 54. Most preferably, all of the flexible laminae 52 are molded to the rigid laminae 54 under compression such that each flexible lamina 52 has a compressive "preload" between the associated radially adjacent pair of rigid laminae 54.

Preferably, the innermost lamina is an elastomeric lamina 52 having an inner circumferential surface 53A bonded to the outer surface 45 of the plain bearing outer ring 22 and the outermost lamina is an elastomeric lamina 52 having an outer circumferential surface 53B bonded to the inner circumferential surface 2a of the second member 2, as indicated in FIGS. 5 and 13. Alternatively, either or both of the innermost and outermost lamina may be a metallic laminae 54 having an inner surface frictionally engaged with the ring outer surface 45 or an outer surface frictionally engaged with the second member inner surface 2a, or be coupled to the inner ring 16 or/and second member 2 by any other appropriate means.

Although the elastomeric bearing section 14 is depicted and described as a single, generally cylindrical laminated body 50, the elastomeric bearing section 14 may be alternatively formed as two or more generally wedge-shaped laminated bearing sections (none shown). Such wedge-shaped laminated bearing sections each include alternating generally arcuate flexible laminae 52 and generally arcuate rigid laminae 54 formed generally as described above for the single cylindrical body 50.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing assembly for movably coupling a first, inner member with a second, outer member, a movable one of the first, inner member and the second, outer member being angularly displaceable with respect to the other one of the first, inner member and the second, outer member about a first axis extending centrally through the first, inner member and about at least one second axis generally intersecting the first axis or skewed with respect to the first axis, the bearing assembly comprising:
   an inner plain bearing section including an inner ring connectable with the first, inner member and having an outer convex, partially ellipsoidal bearing surface, and an outer ring disposed about the inner ring and having an inner concave, partially ellipsoidal bearing surface disposed against the inner ring bearing surface, the inner ring bearing surface and outer ring bearing surface each being configured such that one of the inner and outer ring bearing surfaces slides against the other one of the inner and outer ring bearing surfaces so that one of the inner and outer rings angularly displaces about the first axis extending centrally through the inner member whenever the movable one of the first, inner member and the second, outer member angularly displaces about the first axis and each one of the inner and outer ring bearing ellipsoidal surfaces wedges against the other one of the inner and outer ring ellipsoidal bearing surfaces so as to prevent relative displacement between the inner and outer rings when the movable one of the first, inner member and the second, outer member angularly displaces about the at least one second axis intersecting the first axis or skewed with respect to the first axis; and
   an outer elastomeric bearing section disposed about the plain bearing section, connected with the second, outer member and configured such that at least a portion of the elastomeric bearing section flexes when the movable one of the first, inner member and the second, outer member angularly displaces about the second axis.

2. The bearing assembly as recited in claim 1 wherein the movable one of the first, inner member and the second, outer member is angularly displaceable about a plurality of separate second axes each generally intersecting the first axis or skewed with respect to the first axis, the plain bearing inner and outer rings being configured to angularly displace about each separate one of the second axes when the first, inner member displaces relative to the second, outer member about at least one of the second axes and the at least a portion of the elastomeric bearing being configured to flex when the movable one of the first, inner member and the second, outer member angularly displaces about each one of the second axes.

3. The bearing assembly as recited in claim 1 wherein the inner ring of the plain bearing section has a central bore configured to receive a portion of the first member so as to connect the first member with the bearing assembly.

4. The bearing assembly as recited in claim 1 wherein:
   the outer ring includes a partially spherical body having opposing axial end faces, the concave inner surface extending generally axially between the end faces and defining an interior bore; and
   the inner ring includes a partially ellipsoidal body disposed within the outer ring bore, the ellipsoidal body having two opposing axial ends and the inner ring central bore extending between the two axial ends.

5. The bearing assembly as recited in claim 4 wherein the inner ring partially ellipsoidal body has two generally cylindrical end portions each extending outwardly from a separate one of the two opposing axial ends.

6. The bearing assembly as recited in claim 4 wherein the inner ring is shaped such that planar cross-sections through the first axis are bounded by two curved line sections each having opposing end points and a middle point, each middle point is spaced by a first radial distance from a center point and each end point is spaced by a second, greater radial distance from the center point.

7. The bearing assembly as recited in claim 1 wherein the outer ring includes a partially spherical body having a concave inner surface and a liner layer disposed on the body inner surface and providing the bearing surface of the outer ring, the layer being formed of a material having a hardness substantially lesser than a hardness of the inner ring material.

8. The bearing assembly as recited in claim 1 wherein the elastomeric bearing section is formed as a laminated bearing including a plurality of alternating, substantially flexible laminae and substantially rigid laminae nested coaxially generally about a centerline.

9. The bearing assembly as recited in claim 8 wherein each flexible laminae is formed of an elastomeric material and each rigid laminae is formed of one of a metallic material and a rigid polymeric material.

10. The bearing assembly as recited in claim 8 wherein at least one of the flexible laminae is at least one of compressed, extended and twisted relative to a pair of coaxially adjacent rigid laminae during flexure of the laminated bearing section.

11. The bearing assembly as recited in claim 8 wherein each one of the flexible and rigid laminae has an outside diameter, the plurality of laminae being arranged such that each one of the laminae is disposed within all of the other laminae having an outside diameter greater than the outside diameter of the one lamina.

12. The bearing assembly as recited in claim 8 wherein each one the flexible and rigid laminae is partially spherical.

13. The bearing assembly as recited in claim 1 wherein the elastomeric bearing portion includes a generally cylindrical body or at least two generally wedge-shaped body portions.

14. The bearing assembly as recited in claim 1 wherein the second, outer member has a bore and the bearing assembly is disposed within the second member bore.

15. A bearing assembly for movably coupling a first, inner member with a second, outer member, a movable one of the first, inner member and the second, outer member being angularly displaceable with respect to the other one of the first, inner member and the second, outer member about a first axis extending centrally through the first, inner member and about at least one second axis generally intersecting the first axis or skewed with respect to the first axis, the bearing assembly comprising:
    an inner plain bearing section including an inner ring, the inner ring being connectable with the first, inner member and having an outer convex, partially ellipsoidal bearing surface, and an outer ring disposed about the inner ring and having an inner concave, partially ellipsoidal bearing surface disposed against the inner ring bearing surface, the inner ring bearing surface and outer ring bearing surface each being configured such that one of the inner and outer ring bearing surfaces slides against the other one of the inner and outer ring bearing surfaces so that one of the inner and outer rings angularly displaces about the first axis extending centrally through the inner member whenever the movable one of the first, inner member and the second, outer member angularly displaces about the first axis and each one of the inner and outer ring ellipsoidal bearing surfaces wedges against the other one of the inner and outer ring ellipsoidal bearing surfaces so as to prevent relative displacement between the inner and outer rings when the movable one of the first, inner member and the second, outer member angularly displaces about the at least one second axis intersecting the first axis or skewed with respect to the first axis; and
    an outer, laminated elastomeric bearing section disposed about the plain bearing section, connected with the second, outer member and configured such that at least a portion of the elastomeric bearing section flexes when the movable one of the first, inner member and the second, outer member angularly displaces about the second axis.

16. A mechanical assembly comprising:
an inner, first member, the inner, first member being angularly displaceable about a first axis extending centrally through the inner, first member and about at least one second axis generally intersecting the first axis or skewed with respect to the first axis;
an outer, second member having a bore; and
a bearing assembly disposed within the outer, second member bore and including:
    an inner plain bearing section including an inner ring, the inner ring being connectable with the inner, first member and having an outer convex, partially ellipsoidal bearing surface, and an outer ring disposed about the inner ring and having an inner concave, partially ellipsoidal bearing surface disposed against the inner ring bearing surface, the inner ring bearing surface and outer ring bearing surface each being configured such that one of the inner and outer ring bearing surfaces slides against the other one of the inner and outer ring bearing surfaces so that one of the inner and outer rings angularly displaces about the first axis extending centrally through the inner member whenever the movable one of the inner, first member and the outer, second member angularly displaces about the first axis and each one of the inner and outer ring ellipsoidal bearing surfaces wedges against the other one of the inner and outer ring ellipsoidal bearing surfaces so as to prevent relative displacement between the inner and outer rings when the movable one of the inner, first member and the outer, second member angularly displaces about the at least one second axis intersecting the first axis or skewed with respect to the first axis; and
    an outer elastomeric bearing section disposed about the plain bearing section, connected with the outer, second member and configured such that at least a portion of the elastomeric bearing section flexes when the movable one of the inner, first member and the outer, second member angularly displaces about the second axis.

* * * * *